Dec. 27, 1966  M. MAYRATH  3,294,219
COMPACT CENTER DRIVE AUGER CONVEYOR
Filed March 9, 1965  3 Sheets-Sheet 1

INVENTOR:
MARTIN MAYRATH

BY  Homer R. Montague
ATTORNEY

Dec. 27, 1966  M. MAYRATH  3,294,219
COMPACT CENTER DRIVE AUGER CONVEYOR
Filed March 9, 1965  3 Sheets-Sheet 3

INVENTOR:
MARTIN MAYRATH
BY Homer R. Montague
ATTORNEY

United States Patent Office 3,294,219
Patented Dec. 27, 1966

3,294,219
COMPACT CENTER DRIVE AUGER CONVEYOR
Martin Mayrath, 10707 Lennox Lane,
Dallas, Tex. 75229
Filed Mar. 9, 1965, Ser. No. 438,300
6 Claims. (Cl. 198—213)

This invention pertains to conveyors of the spiral auger type, and in particular to conveyors of this kind in which the driving power is applied to the auger flighting or flights at an intermediate point, lengthwise of the conveyor, rather than at either end of the same. The term "center drive" is intended to refer to an auger conveyor of this kind, it being understood that the drive need not be precisely at the "center" of the conveyor length, so long as it is at an intermediate location, thus avoiding the need for lengthy belt runs from the prime mover to an extreme end of the conveyor.

In some respects, the conveyor of the present invention is an improvement upon a center drive auger conveyor such as disclosed and claimed in U.S. Patent No. 3,198,-320 of August 3, 1965. In that patent, the driving power was applied to a pulley which lay between adjacent ends of coaxial auger flights, the pulley substantially filling the gap between the proximate ends of respective tubular housings for the upper and lower auger flights. The maintenance of the auger flights, and housing sections, in properly aligned position, required extensive outrigged framework parts and other complications, misadjustment of the parts was common, leading to excessive grain leakage and mechanical wear, and short operating life of the machine.

The present invention provides a center drive auger conveyor, within the meaning of "center drive" as defined above, which is free from the requirement for an extensive externally rigged framework, and which is therefore much more compact and wieldy than the previous apparatus. There is no gap at all between auger sections, and consequently no leakage of grain or like fine material being conveyed. The parts are not subject to adjustment by the user, being maintained in perfect alignment throughout their life by a solid welded construction. The transfer of power to both auger sections is by a pretensioned belt drive that dispenses with expensive and inefficient gears. Finally, the new construction provides increased resistance to the abrasive effects of the fine dust usually associated with the conveyance of wheat or other grains, and indeed of many other commodities normally handled by such conveyors. In particular, in this connection, the auger shaft bearings, which are most subject to this abrasive wear, are maintained entirely outside the area where the material being conveyed is present.

In general, the conveyor of the present invention utilizes two separate auger flights, of opposite "hand" (one right-hand, the other left-hand from the standpoint of helical pitch slant), and which are not coaxial, but which have proximate end sections which are offset from one another on parallel axes, and which overlap each other with reference to the lengthwise direction. The region of overlap is surrounded by an enclosing box arrangement which permits the transfer of conveyed material from the upper end of a lowermost flight to the lower end of an uppermost flight. The terminal ends of these overlapped sections extend through end walls of the box arrangement, and they are secured to respective pulleys outside the box walls, these pulleys being driven by a single belt drive from a second pair of pulleys, the set of four pulleys providing a simmetrical and balanced drive utilizing an extremely high value of belt tension.

Various other objects, features and advantages of the new conveyor will best be understood from the following detailed specification of a preferred embodiment thereof, taken in connection with the appended drawings, in which.

Figure 1:
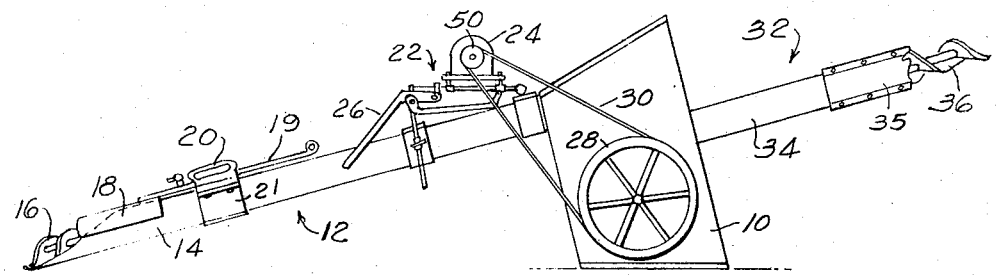
FIG. 1 is a side elevation of a conveyor incorporating the invention.

FIG. 1 of the drawings shows a general side view of a conveyor that incorporates the principles of the invention. Certain conventional parts have been omitted for clarity; thus, no wheeled supporting framework or the like has been illustrated, though such may be provided in any of various ways that are familiar to those skilled in this art. For use at a fixed, approximately minimal horizontal angle of about 15 degrees elevation, the conveyor may simply rest upon the ground line at the lower or bottom surface of a drive casing or box 10.

The lower conveyor section 12 comprises the usual tubular casing 14 having the upper portion of its left end cut away to expose the auger flight 16, the degree of exposure being regulatable by the position of a sliding cover or shutter 18, whose sliding control rod 19 may be clamped in adjusted position to a mounting band 21 on casing 14, and which band may also incorporate a handle 20 by which the conveyor may be tilted and rotated for positioning as desired. Surmounting the tubular casing 14 is a mounting frame 22 for the prime mover, motor or engine, 24, preferably movable fore and aft on the frame by a clutch lever 26 to loosen or tighten a belt drive 30 to a pulley 28.

An upwardly extending conveyor section 32 also comprises a tubular casing 34 within which is the auger flight 36. The arrangement is such that grain, or the like, conveyed upwardly by auger 16, is transferred, within the casing 10, to the lower end of the auger 36, and thence upwardly to the desired outlet level. The general flow path of the grain or other conveyed material, and the relationships of the augers and drive directions, are indicated schematically in FIG. 2, by way of preliminary explanation.

Figure 2:
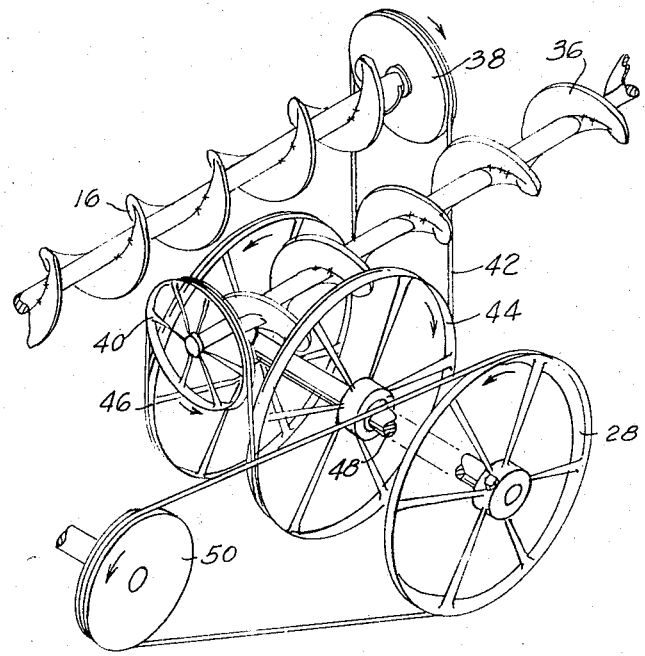
FIG. 2 is a perspective diagrammatic showing of the drive pulleys and belting arrangement of the invention.

Referring to FIG. 2, from which housings and casings have been eliminated for clarity, the lower auger flight 16 terminates at its upper end in a pulley 38 secured to the shaft of that flight, and the pitch direction or "hand" of flight 16 is such that the conveyor will lift or raise material when the pulley 38 rotates in the direction indicated by the arrow beside it. Beneath the upper end of flight 16 lies the lower end of flight 36, whose pitch direction or "hand" is opposite to that of flight 16. Thus, the pulley 40 driving the flight 36 will normally rotate in the opposite sense to that of pulley 38. These two pulleys are conveniently rotated in these opposite directions by a common belt 42 which wraps about them and also about two transfer pulleys 44, 46 mounted coaxially on a transverse axis. These two transfer pulleys also have to rotate in opposite directions, as indicated by the directional arrows in the figure. Thus, in effect, pulley 46 may be secured to one end of a transverse shaft 48 upon which pulley 44 is loosely rotatable, while the other end of shaft 48 has secured thereto the drive pulley 28 in turn belted to the prime mover or engine pulley 50.

Consideration of the schematic diagram of FIG. 2 will make it clear that the arrangement shown allows grain or the like material to be raised by the lower auger section to a certain level, and thence transferred (by dropping) to the upper auger section for further conveyance, with both auger sections being subjected to the driving torque only at or near the "center" of the total conveyor length; that is, without requiring drive effort application to the outer ends of the auger, or to either end of the machine as a whole. Also, FIG. 2 makes it clear that while the overlapped ends of the two auger flights will require some form of housing to ensure the escape-proof transfer of material from one flight to the next one, there is no necessity for any physical gap between them that would permit the escape of grain to the outside. In actual practice, and as detailed below, the pulleys 38, 40, et cetera will lie outside this housing or box that surrounds the overlapped flight ends, the usual auger flight shafts being journalled in respective bearings where they pass through the housing walls.

Figure 3:
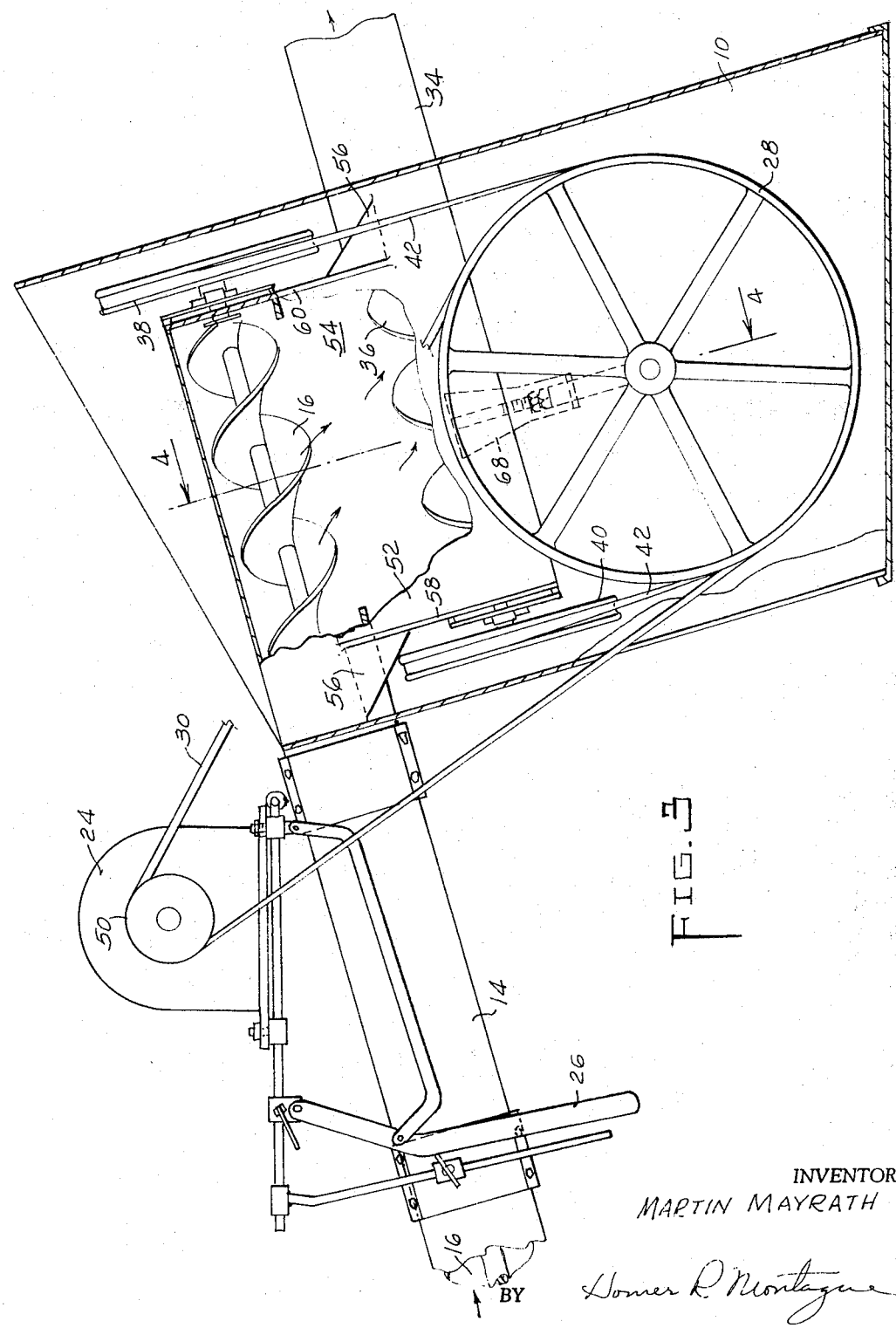
FIG. 3 is an enlarged view of the central portion of FIG. 1, with parts broken away for clarity.

FIG. 3 is a side view to a larger scale, looking in the same direction as FIG. 1, but with parts broken away to illustrate the construction. The outer casing 10 is merely a relatively light-gauge sheet metal housing serving to protect from fouling the auger shaft end pulleys, the idler pulleys, and their common belt, and to provide a stable support for the conveyor if a wheeled framework or support is not employed. The lower auger tube 14 enters this housing at the left wall (as seen in FIG. 3) and extends nearly to the opposite wall thereof, where the auger flight 16 terminates at pulley 38. The upper auger tube 34 also extends almost through the housing 10, parallel to tube 14, and spaced therefrom by tangential box walls 52, 54 welded to the sides of the auger tubes and braced thereon by triangular gusset plates 56. The lower wall of auger tube 14, and the upper wall of tube 34, within the box structure, are cut away to permit the free transfer of grain or like conveyed material from the former to the latter; see also FIG. 4. The end of each auger tube, within the casing 10, is closed by an end wall 58, 60, these closing the "box" construction whose side walls are the plates 52 and 54. The auger shaft in each case passes through its appurtenant end wall and is journalled therein by a sealed bearing, the part of the shaft protruding through the wall being secured to the drive pulley. The drive pulleys are preferably threaded upon the shaft ends by left-hand threads so that the drive torques will tend to tighten the grip, and the pulley hubs may additionally be welded to the shaft ends for greater security of the connections.

Figure 4:
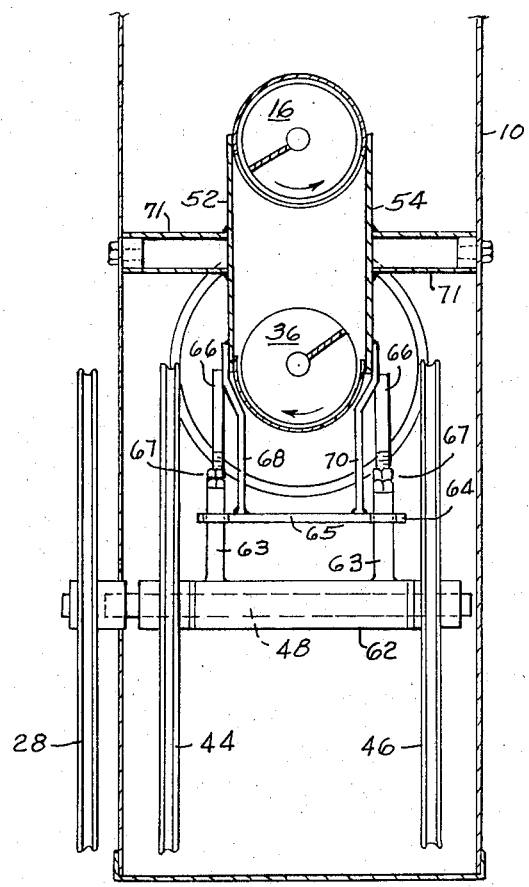
FIG. 4 is a vertical sectional view, taken on line 4—4 of FIG. 3.

FIG. 4 of the drawings shows in greater detail the arrangement of the transverse shaft 48 and idler pulleys. The shaft is suspended by a hanger tube 62 carried by hollow tubes 63 which slide through ears 64 in a bracket 65 whose side members 68, 70 have their upper ends welded to the sides of the box side walls 52 and 54. As is obvious from FIGS. 2 and 3, the belt 42 in effect suspends idler pulleys 44 and 46 (and shaft hanger tube 62) beneath the connected ends of the auger tubes. Hence, the tension in that belt can be increased as desired by pushing downward on hanger 62 as seen in FIG. 4. To allow such tension adjustment, each hollow tube 63 slidably receives the lower end of a round bar 66 whose upper end is welded to the corresponding bracket 68 or 70 where it joins the side wall plate 52 or 54.

Adjusting nuts 67 are threaded onto the bars 66, and engage the upper ends of hanger support tubes 63, so that by turning the nuts the hanger tube 62 can be pushed downward to develop the desired tension level in belt 42.

The outer casing 10 is bolted to tubular members 71 extending from the side box walls 52 and 54 and welded thereto; the removable bolts here allow the endless belt 42 to be replaced readily, passing the outer ends of members 71 and of shaft 48 (pulley 28 being temporarily removed).

Figure 5:
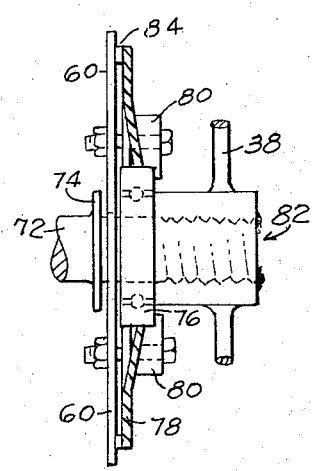
FIG. 5 is an enlarged detail of the connection of one auger shaft to its end thrust bearing and drive pulley.

FIG 5 details the passage of an auger shaft 72 through one end wall 60, there being a slinger disc 74 about the shaft 72 within the wall 60, and a sealed ball bearing 76 supporting the shaft outside the wall 60, the said ball bearing having a self-aligning action by virtue of its being received loosely in a hole in a dished plate 78 and abutted against diametrally opposite lugs 80 welded on the said plate. The threaded end of the shaft receives the hub of pulley 38 and may be welded thereto as at 82. The dished plate 78 is secured to the wall 60 by suitable bolts, as shown, and spaced from the wall by lugs 84. The arrangement ensures that practically none of the fine abrasive material can reach the bearings which support the auger shafts; any such fine material which escapes around slinger 74 and through the shaft clearance hole in plate 60 falls free in casing 10 and does not reach the bearing 76.

The arrangement of shaft bearing, end plate and the like for auger 36, at pulley 40, duplicates the one just described. Numeral 35 in FIG. 1 designates a bolted clamp sleeve connector by which the desired upward length of the auger can be attained by additional joints of tubing.

Figure 6:
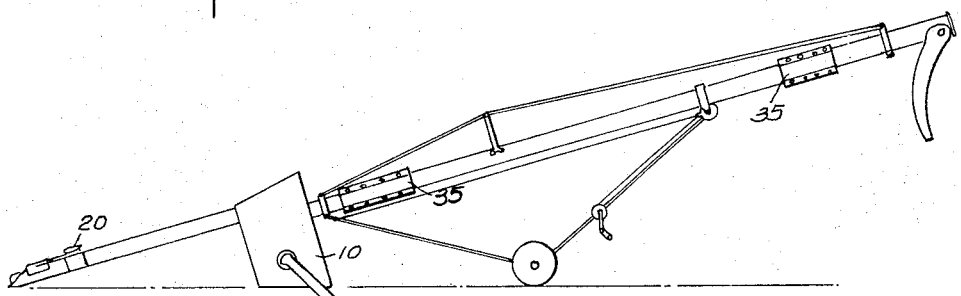
FIG. 6 is a view similar to FIG. 1, but to a smaller scale and illustrating a power take-off drive input system and a typical wheeled undercarriage.

FIG. 6 shows (to a smaller scale than in FIG. 1) an arrangement in which a very considerable total conveyor length is powered by the apparatus as described above, except that the mounted motor assembly 22, 24 and pulley 28 have been replaced by a power take-off connection (bar 82 with universal joints at each end). This view also shows one form of wheeled carriage adapted to the apparatus.

While the invention has been described herein in some detail, it will be appreciated that various changes can be made without departing from the spirit of the invention as defined in the appended claims.

What is claimed is:

1. An auger conveyor construction comprising a pair of auger tubes having respective end portions thereof substantially overlapping and in parallel offset communication with one another, respective right-hand and left-hand helical auger flights in said auger tubes and each journalled in a respective end plate of the corresponding tube, each of said end plates being secured to the side wall of the other tube; a shaft for each auger flight, said shafts extending through the respective end plates and secured to respective pulleys lying in planes perpendicular to the common plane of said auger flight shafts; a pair of transfer pulleys mounted on a common transverse axis and spaced and dimensioned to have common tangents with reference to the pulleys of said auger flight shafts; an endless belt connecting all of said pulleys, and means for driving one of said transfer pulleys.

2. An auger conveyor construction in accordance with claim 1, including a bearing plate secured outside each of said respective end plates and a shaft bearing loosely mounted in each bearing plate.

3. An auger conveyor construction in accordance with claim 2, in which said bearing plates are mounted in spaced relation to said end plate.

4. An auger conveyor construction in accordance with calim 1, in which each of said auger flights extends substantially up to the corresponding end plate of its auger tube.

5. An auger conveyor construction in accordance with claim 1, in which the shafts of said auger flights are offset from one another a distance substantially greater than the sum of the radii of said flights, to accommodate auger flight pulleys of diameter greater than the diameters of said auger tubes.

6. An auger conveyor construction in accordance with claim 1, including bearing hanger means for said transfer pulleys, and means for adjusting the position of said hanger means and thereby the tension of said endless belt.

References Cited by the Examiner
UNITED STATES PATENTS

| 2,988,203 | 6/1961 | Peterson | 198—213 |
| 3,055,519 | 9/1962 | Hollyday | 198—128 |

OTHER REFERENCES

German printed application 1,000,282, January 1957, Horn.

EVON C. BLUNK, *Primary Examiner.*

RICHARD E. AEGERTER, *Examiner.*